United States Patent
Ishii et al.

(10) Patent No.: US 10,467,505 B2
(45) Date of Patent: Nov. 5, 2019

(54) SPATIAL INFORMATION DELIVERY SYSTEM, SPATIAL INFORMATION DELIVERY METHOD, AND NON-TRANSITORY COMPUTER READABLE MEDIUM

(71) Applicant: KABUSHIKI KAISHA TOSHIBA, Tokyo (JP)

(72) Inventors: Gaku Ishii, Kanagawa (JP); Mikito Iwamasa, Tokyo (JP); Hisashi Hayashi, Kanagawa (JP); Toshimitsu Kumazawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/462,202

(22) Filed: Mar. 17, 2017

(65) Prior Publication Data

US 2018/0082155 A1    Mar. 22, 2018

(30) Foreign Application Priority Data

Sep. 16, 2016  (JP) ................. 2016-181680

(51) Int. Cl.
*G06K 9/62* (2006.01)
*G06T 7/73* (2017.01)
(Continued)

(52) U.S. Cl.
CPC ......... *G06K 9/6267* (2013.01); *G06K 9/6288* (2013.01); *G06T 7/73* (2017.01);
(Continued)

(58) Field of Classification Search
None
See application file for complete search history.

(56) References Cited

U.S. PATENT DOCUMENTS

| | | | |
|---|---|---|---|
| 9,557,750 B2 * | 1/2017 | Gust | G05D 23/19 |
| 2010/0223031 A1 * | 9/2010 | Vincent | G06F 17/5004 703/1 |

(Continued)

FOREIGN PATENT DOCUMENTS

| | | |
|---|---|---|
| JP | 11-88935 | 3/1999 |
| JP | 2001-251674 | 9/2001 |

(Continued)

*Primary Examiner* — Delomia L Gilliard
(74) *Attorney, Agent, or Firm* — Finnegan, Henderson, Farabow, Garrett & Dunner, L.L.P.

(57) ABSTRACT

A spatial information delivery system according to an embodiment of the present invention includes a partial spatial information generation device, and a plurality of partial spatial information transmission devices existing within a facility. The partial spatial information generation device generates partial spatial information which is part of spatial information relating to the facility and which is specific to each of the partial spatial information transmission devices, for each of the partial spatial information transmission devices based on locations of the partial spatial information transmission devices. Each of the partial spatial information transmission devices transmits the partial spatial information corresponding to the own partial spatial information transmission device.

13 Claims, 16 Drawing Sheets

(51) Int. Cl.
*H04L 29/06* (2006.01)
*G06K 9/00* (2006.01)

(52) U.S. Cl.
CPC ...... *H04L 65/4061* (2013.01); *G06K 9/00664* (2013.01); *G06T 2207/30244* (2013.01)

(56) References Cited

U.S. PATENT DOCUMENTS

2013/0184865 A1* 7/2013 Guo .................... G05D 1/0274
 700/248
2014/0035725 A1* 2/2014 Bruemmer ......... G06K 7/10306
 340/8.1
2015/0369612 A1 12/2015 Nishimura et al.

FOREIGN PATENT DOCUMENTS

| | | | | |
|---|---|---|---|---|
| JP | 2005-157744 | | 6/2005 | |
| JP | 2006-157737 | | 6/2006 | |
| JP | 2006-253888 | A | 9/2006 | |
| JP | 2010277587 | A * | 12/2010 | |
| JP | 5574286 | | 8/2014 | |
| WO | WO 2014/132802 | | 9/2014 | |
| WO | WO 2014132802 | A1 * | 9/2014 | ........... G01C 21/206 |
| WO | WO 2017154806 | A1 * | 9/2017 | |

* cited by examiner

SPATIAL INFORMATION DELIVERY SYSTEM, SPATIAL INFORMATION DELIVERY METHOD, AND NON-TRANSITORY COMPUTER READABLE MEDIUM

CROSS-REFERENCE TO RELATED APPLICATION (S)

This application is based upon and claims the benefit of priority from Japanese Patent Application No. 2016-181880, filed Sep. 16, 2016; the entire contents of which are incorporated herein by reference.

An embodiment described herein relate generally to a spatial information delivery system, a spatial information delivery method, and a non-transitory computer readable medium.

BACKGROUND

From a viewpoint of efficiency, automation and cost reduction of maintenance of equipment or the like in facility, automatic maintenance work by a movement device such as a robot, which can autonomously move is being tried. Efficient and autonomous movement of the movement device requires two processes of estimation of a current location of the movement device (self-location estimation) and recognition of a surrounding environment (space recognition). Therefore, the movement device requires to have map data for performing self-location estimation and space recognition.

As a structure inside the facility in which the movement device moves becomes complicated, a data size of the map data becomes larger. Therefore, if the map data is held by the movement device which moves in a building having a complicated structure, there arise problems such as processing delay and increase in power consumption due to increase in load of computing processing, communication resource crunch, or the like.

Further, there is also a case where restriction is set at equipment within the facility, or the like. For example, in terms of security or the like, there is also a case where entry to a specific room is prohibited in a specific time slot. Therefore, it is necessary to provide information relating to restriction of entry to the movement device that maintains the equipment within the facility, which may result in further increase in information to be processed by the movement device.

DETAILED DESCRIPTION

An embodiment of the present invention suppresses amount of data corresponding to spatial information to be delivered to a movement terminal.

A spatial information delivery system according to an embodiment of the present invention includes a partial spatial information generation device, and a plurality of partial spatial information transmission devices existing within a facility. The partial spatial information generation device generates partial spatial information which is part of spatial information relating to the facility and which is specific to each of the partial spatial information transmission devices, for each of the partial spatial information transmission devices based on locations of the partial spatial information transmission devices. Each of the partial spatial information transmission devices transmits the partial spatial information corresponding to the own partial spatial information transmission device.

An embodiment will be explained in detail below with reference to the accompanying drawings. The present invention is not limited to the embodiment.

Figure 1:
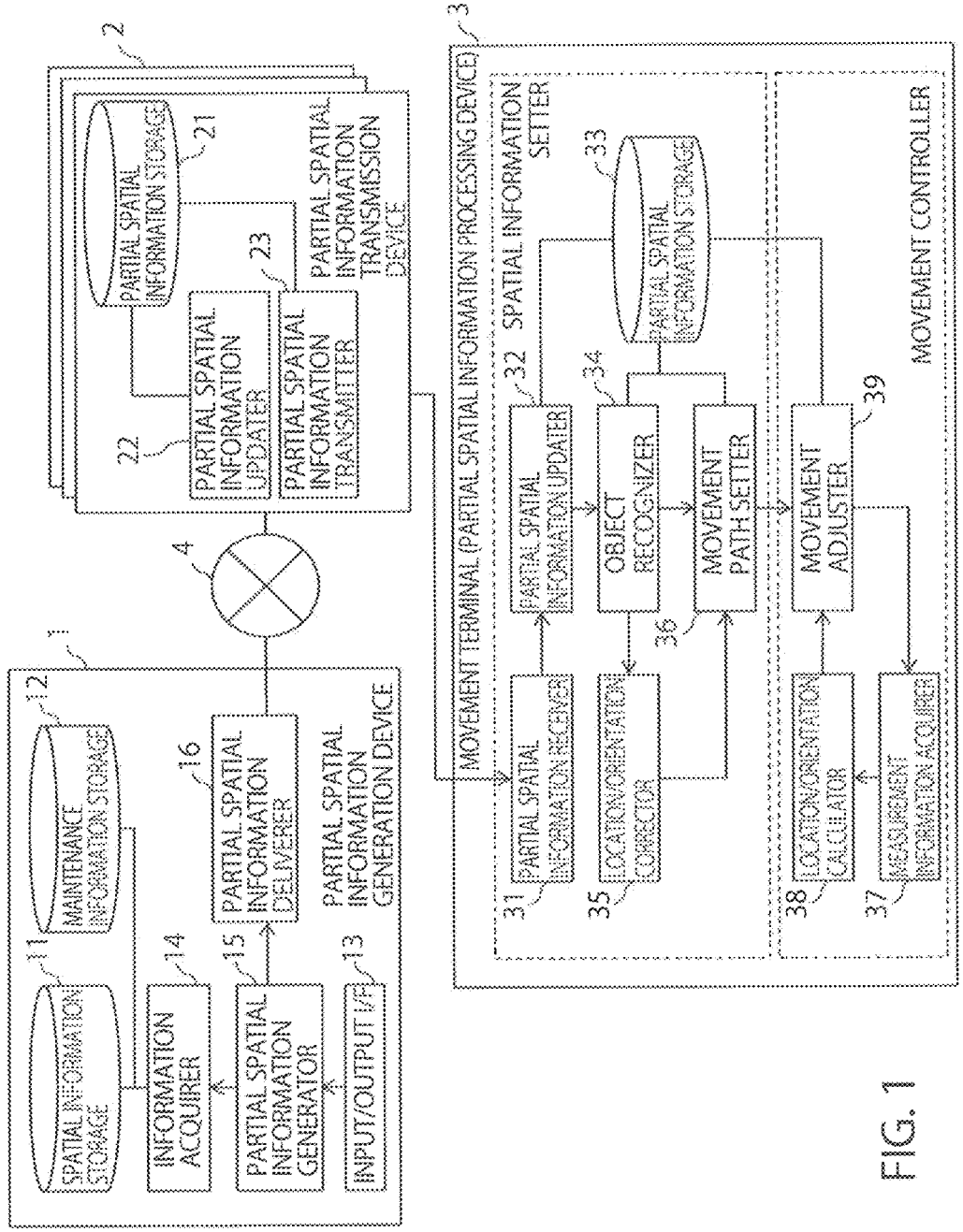
FIG. 1 is a block diagram illustrating an example of a schematic configuration of a spatial information delivery system according to an embodiment of the present invention.

FIG. 1 is a block diagram illustrating an example of a schematic configuration of the spatial information delivery system according to an embodiment of the present invention. The spatial information delivery system according to the embodiment of the present invention includes a partial spatial information generation device 1, a plurality of partial spatial information transmission devices 2 and a movement terminal (partial spatial information processing device) 3.

The partial spatial information generation device 1 includes a spatial information storage 11, a maintenance information storage 12, an input/output interface (input/output I/F) 13, an information acquirer 14, a partial spatial information generator 15 and a partial spatial information deliverer 16.

The partial spatial information transmission device 2 includes a partial spatial information storage 21, a partial spatial information updater 22 and a partial spatial information transmitter 23.

The movement terminal 3 includes a partial spatial information receiver (information communicator) 31, a partial spatial information updater 32, a partial spatial information storage 33, an object recognizer 34, a location/orientation corrector 35, a movement path setter 36, a measurement information acquirer 37, a location/orientation calculator 38 and a movement adjuster 39.

It is assumed in the spatial information delivery system of the present embodiment that the movement terminal 3 moves within predetermined facility. The spatial information delivery system delivers information to be used when the movement terminal 3 moves within the facility to the movement terminal 3.

It is assumed that the partial spatial information generation device 1 and each partial spatial information transmission device 2 are communicatively connected via a communication network. Each partial spatial information transmission device 2 receives information transmitted from the partial spatial information generation device 1. Further, each partial spatial information transmission device 2 transmits information to be used when the movement terminal 3 moves within the facility.

Note that the partial spatial information transmission devices 2 may perform communication with each other via the communication network 4. For example, one partial spatial information transmission device 2 may confirm that another partial spatial information transmission device 2 operates by confirming whether communication is possible or not with the another partial spatial information transmission device 2.

It is assumed that the movement terminal 3 is a device which can move, such as a robot which can autonomously move. For example, the movement terminal 3 may be a robot which maintains the equipment. The movement terminal 3 may be a device which assists movement of a user. For example, the movement terminal 3 may be an information processing terminal carried by the user. In this case, the movement terminal 3 assists movement of the user by indicating a path along which the user moves, to the user. Note that there may be a plurality of movement terminals 3 within the facility.

While it is assumed that the facility in which the movement terminal 3 moves is a building including rooms, the facility may be outdoor facility in which a region is defined by predetermined boundaries. For example, the facility may be a stadium including a plurality of athletic fields.

The movement terminal 3 requires to recognize a current location (self-location) of the movement terminal 3, space around the self-location, a path, or the like, to move within the facility. While, in the spatial information delivery system according to the present embodiment, these information required by the movement terminal 3 is delivered, it is assumed that, in order to reduce processing load of the movement terminal 3, suppress power consumption, or the like, information of the whole structure within the facility and the overall path to a destination is not provided to the movement terminal 3.

The partial spatial information generation device 1 generates partial spatial information to be used when the movement terminal 3 moves in the facility. The partial spatial information means part of spatial information. The spatial information is information relating to space existing within the facility and a location of the equipment. For example, space corresponds to a room, a corridor, or the like, within the facility. The equipment corresponds to various things such as a bench, a window and lighting provided in the facility. Hereinafter, the space and the equipment included in the spatial information will be referred to as objects. Particularly, an object relating to space will be referred to as a spatial object. The spatial information indicates locations of these objects located within the facility.

Further, the spatial information may include information relating to an attribute, or the like, as well as the location. In the case where spatial information including attribute information is used, a BIM (Building Information Modeling) model, which is used in BIM utilized in planning and execution design of the building, can be used as the spatial information. The BIM model is one type of building information models.

The BIM constructs a three-dimensional BIM model on a computer using BIM model software. The BIM model is an information model according to how a person perceives things such as a building and equipment (ontology). Also, The BIM model is a dataset which integrally expresses three-dimensional information, attribute information and relationship information which are related to components of a building or the like according to a specified format. The three-dimensional information indicates components, that is, a location and a shape of the object in a three dimension. The attribute information indicates meaning or property of the components. For example, the attribute information includes a type of a room, a name, an area, a material, specifications of a member, or the like. The relationship information indicates relationship among the components. The relationship information includes relationship for forming the building such as structure relationship, configuration relationship and connection relationship. With the BIM model, it is possible to physically or conceptually interpret a spatial structure within the building and also interpret locational relationship of the components in a similar manner. In the case where the BIM model is used as the spatial information, the spatial information may include information generated from the BIM model.

In this manner, since the spatial information includes various kinds of attribute information and relationship information of the equipment within the facility, amount of data corresponding to the spatial information is large. Therefore, if the spatial information is provided as is to the movement terminal 3, there arises a problem such as increase in processing load of the movement terminal 3, increase in power consumption and increase in capacity of an internal storage.

Therefore, the partial spatial information generation device 1 extracts part from the spatial information to generate partial spatial information. By the movement terminal 3 using this partial spatial information, it is possible to reduce processing load of the movement terminal 3, suppress power consumption, downsize the movement terminal 3 and resolve communication resource crunch.

While part to be extracted is part to be used when the movement terminal 3 moves, information to be required when the movement terminal 3 moves differs according to application of the movement terminal 3, a movement range, a movement path, or the like. Therefore, in the present embodiment, individual partial spatial information is generated not for each movement terminal 3, but for each partial spatial information transmission device 2.

The part of the spatial information which is used as the partial spatial information is determined based on the locations of the partial spatial information transmission devices 2. Therefore, if the locations of the partial spatial information transmission devices 2 are different, the partial spatial information to be generated is highly likely to be different. However, there can be also a case where even if the locations of the partial spatial information transmission devices 2 are different, the generated partial spatial information is the same as a result.

Note that the partial spatial information may be processed based on movement purpose of the movement terminal 3, surrounding situation of the movement terminal 3, attributes of surrounding objects, or the like. Further, the partial spatial information may include other information such as the locations of the partial spatial information transmission devices 2, an identification ID and information relating to the path. Further, the spatial information may include information relating to a path generated by connecting the objects. For example, the path may be generated using the relationship information among the objects. A method for generating the partial spatial information will be described later.

The partial spatial information transmission device 2 is a device which transmits the partial spatial information. It is assumed in advance that there are a plurality of partial spatial information transmission devices 2 within the facility. The partial spatial information generation device 1 generates partial spatial information for each partial spatial information transmission device 2 based on the location of each partial spatial information transmission device 2. The partial spatial information transmission device 2 then acquires the partial spatial information associated with the own device from the partial spatial information generation device 1 and transmits the partial spatial information.

Figure 2:
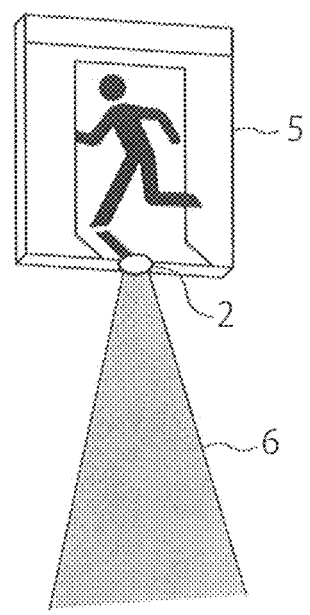
FIG. 2 is a diagram illustrating an example of a partial spatial information transmission device.

FIG. 2 is a diagram illustrating an example of the partial spatial information transmission device 2. In FIG. 2, the partial spatial information transmission device 2 is provided at emergency light 5. It is assumed that the partial spatial information transmission device 2 transmits the partial spatial information using a push-type communication scheme. That is, the transmission is one way, and the movement terminal 3 cannot receive the information transmitted by each partial spatial information transmission device 2 unless the movement terminal 3 is located within a specific range. In FIG. 2, as an example of the push-type communication scheme, the partial spatial information transmission device 2 uses visible light 6. The movement terminal 3 can acquire the partial spatial information only after the movement terminal 3 enters a range of the visible light 6, that is, a range where the partial spatial information is provided. For that reason, the movement terminal 3 can estimate that the movement terminal 3 is located within the range where the partial spatial information transmission device 2 provides the partial spatial information when the movement terminal 3 receives the spatial information. Further, by using the visible light 6, it is possible to limit the range where the partial spatial information is provided, so that it is possible to improve security.

Note that, in terms of security, the partial spatial information transmission device 2 may transmit an identification ID thereof and may transmit the partial spatial information according to a response from the movement terminal 3 which receives the identification ID. In the case where the partial spatial information is transmitted using the visible light 6, there is a risk that other information processing devices which pass through the range of the visible light 6 acquire the partial spatial information. Therefore, the partial spatial information transmission device 2 may perform two-stage transmission processing. Alternatively, the partial spatial information may be encrypted. It is also possible to prevent information processing devices other than the movement terminal 3 from acquiring the partial spatial information with the encrypted partial spatial information.

Note that, in the case where the movement terminal 3 can recognize or predict that the movement terminal 3 enters the range where the visible light 6 can reach, transmission and reception of the partial spatial information may be performed using a pull-type communication scheme for requesting the partial spatial information to the partial spatial information transmission device 2. For example, in the case where the user holds the movement terminal 3, the partial spatial information may be requested to the partial spatial information transmission device 2 through operation of the user. Further, in the case where a movement robot predicts that the movement robot is located in the vicinity of the partial spatial information transmission device 2 based on a distance or a surrounding image, the partial spatial information may be requested to the partial spatial information transmission device 2. However, when the pull-type communication is used, the movement terminal 3 requires to actively transmit the request, and processing load of the movement terminal 3 increases as a result. Further, the partial spatial information transmission device 2 may support both the push-type and the pull-type communication schemes.

As in FIG. 2, by using equipment already provided within the facility, cost for deploying the partial spatial information transmission devices 2 may be suppressed. Note that the emergency light is light for evacuation guidance having a function of illuminating a room, a corridor, or the like, in case of power outage. The emergency light incorporates a battery which supplies power in the case where a power supply system within the facility is stopped as an emergency power supply. If the partial spatial information transmission device 2 is connected to the emergency power supply, the partial spatial information transmission device 2 can transmit the partial spatial information and give an instruction to the movement terminal 3 even in case of power outage of the facility.

The movement terminal 3 estimates self-location by receiving the partial spatial information transmitted from the partial spatial information transmission device 2. Further, the movement terminal 3 moves using the path included in the partial spatial information.

The movement terminal 3 modifies a reference coordinate provided in advance based on the acquired partial spatial information and then recognizes a range in the vicinity of the partial spatial information transmission device 2 which transmits the acquired partial spatial information. The movement terminal 3 then sets a path from the partial spatial information transmission device corresponding to the acquired partial spatial information to another partial spatial information transmission device included in the partial spatial information based on the path included in the partial spatial information. By this means, the movement terminal 3 can move from the partial spatial information transmission device 2 to the next partial spatial information transmission device 2. In this manner, even if the movement terminal 3 does not recognize the overall path to the destination, the movement terminal 3 can reach the destination by moving while going through the partial spatial information transmission devices 2.

Figure 3:
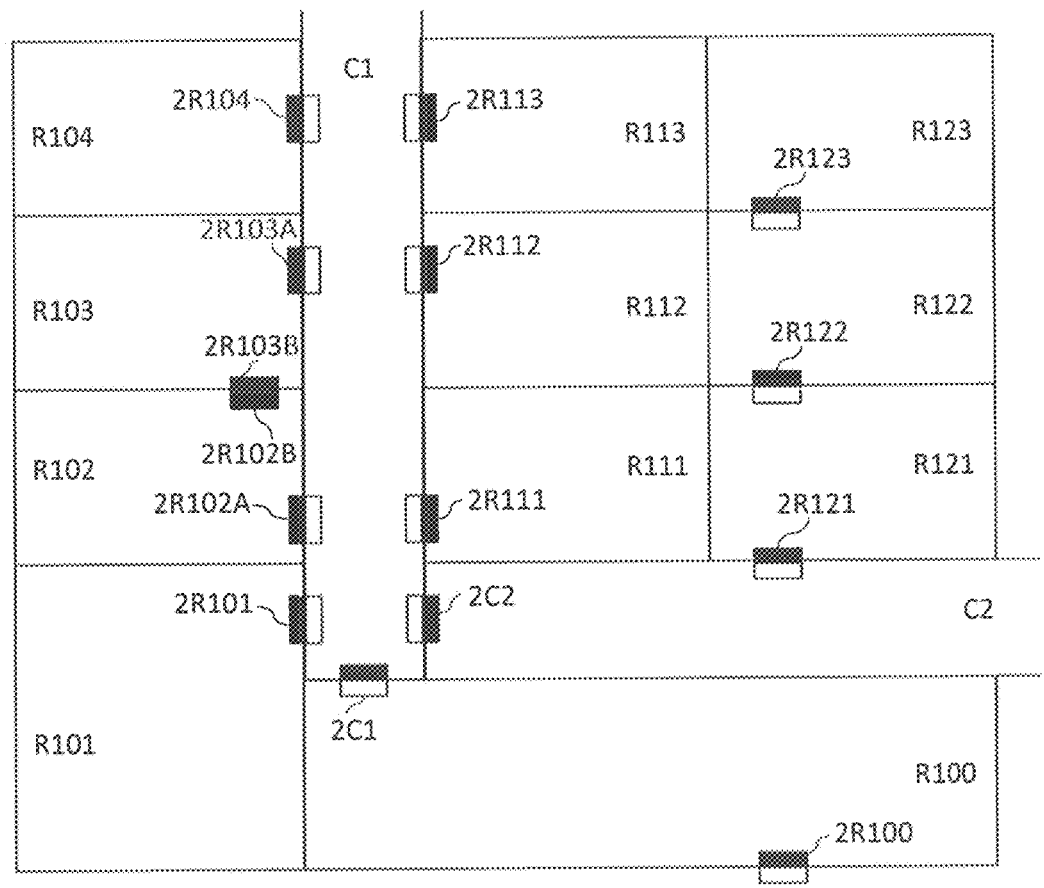
FIG. 3 is a diagram explaining arrangement of partial spatial information transmission devices.

FIG. 3 is a diagram explaining arrangement of the partial spatial information transmission devices 2. A certain floor within a building in which the movement terminal 3 moves is illustrated. On the floor, a plurality of partial spatial information transmission devices 2, and a room and a corridor in which each partial spatial information transmission device 2 exists are illustrated. A symbol R indicates the room, and a symbol C indicates the corridor. Numbers after R and C indicate identification numbers. White portions of the partial spatial information transmission devices 2 in FIG. 3 indicate opening portions to the rooms.

In FIG. 3, the partial spatial information transmission devices 2 are arranged so as to correspond to opening portions for allowing entrance and exit to/from these rooms. In other words, doors of the rooms exist at locations where the partial spatial information transmission devices 2 are indicated. That is, the partial spatial information transmission devices 2 exist at boundaries between spatial objects. The path through which the movement terminal 3 moves is determined based on the arrangement of the partial spatial information transmission devices 2. Accordingly, by the partial spatial information transmission devices 2 being arranged so as to correspond to the opening portions, a path for the movement terminal 3 to enter the room can be generated for each opening portion, so that the movement terminal 3 which moves through the path can move across the spatial objects. Note that the opening portion may be an opening portion which connects the room and the corridor or an opening portion which connects different rooms. Further, the opening portion may be provided at an entrance door of the facility. In other words, the opening portion may be an opening portion which connects outside and the room or may be an opening portion which connects the outside and the corridor.

Figure 4:
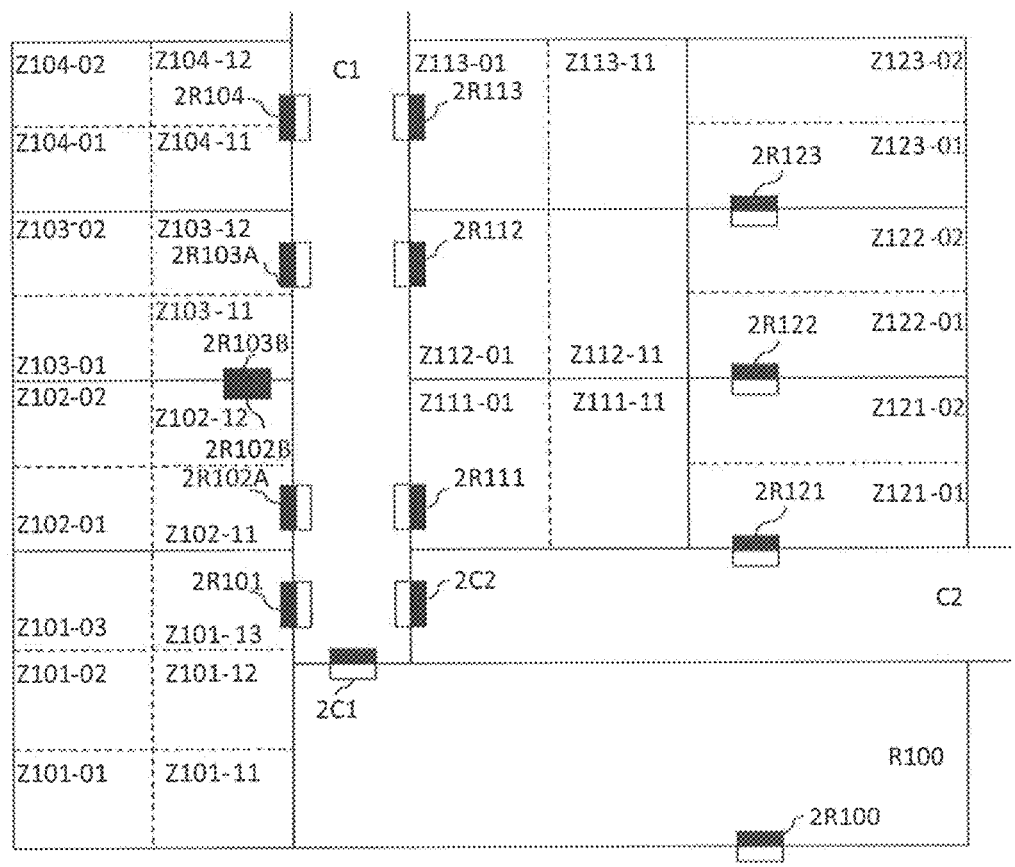
FIG. 4 is a diagram explaining a case where a room is divided into a plurality of virtual segments of space.

FIG. 4 is a diagram explaining a case where the room is divided into a plurality of virtual segments of space. In FIG. 4, one room is divided into a plurality of virtual segments of space. Here, a virtual segment of space is referred to as a partial region. A symbol Z indicates a partial region. A number after Z indicates an identification number.

For example, in the case where the movement terminal 3 is a surveillance device which confirms the state of the room, there can be a case where, even if the movement terminal 3 is made to pass through the center of the room, the movement terminal 3 cannot confirm a corner of the room, or a blind area by equipment within the room, or the like. Therefore, as in FIG. 4, it is also possible to divide one room into a plurality of partial regions and cause the movement terminal 3 to pass through the partial regions. By this means, it is possible to adjust points through which the movement terminal 3 passes.

A method for generating partial regions is not particularly limited. For example, in the case where partial regions are created by dividing the region of the room, a direction of division, the number of regions to be divided into, or the like, may be freely determined as appropriate.

Figure 5:
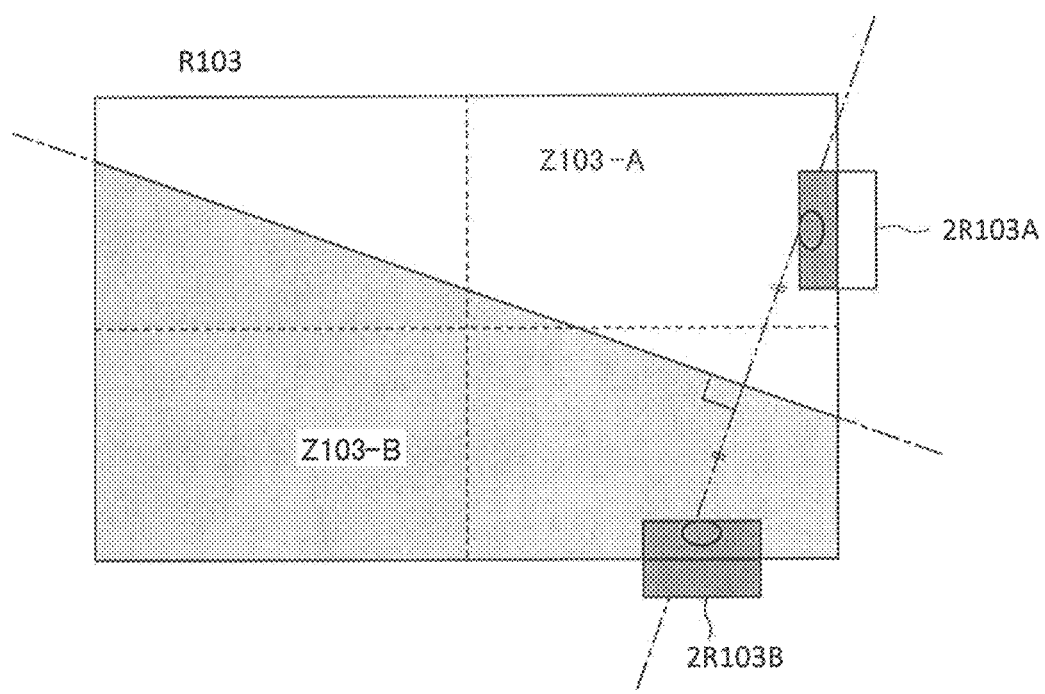
FIG. 5 is a diagram illustrating an example of a partial region.

Further, as in R103 in FIG. 3, in the case where there are a plurality of partial spatial information transmission devices 2 within physical space such as a room and a corridor, a partial region to be managed by each partial spatial information transmission device 2 may be determined. A method for determining partial regions may be appropriately determined. FIG. 5 is a diagram illustrating an example of the partial region. A partial region Z103-A indicated with white and a partial region Z103-B indicated with gray, which are divided based on Voronoi division are illustrated. The Voronoi division is a method in which, in the case where there are a plurality of generating points on a plane, the plane is divided into a plurality of regions based on which generating point a point on the plane is the closest.

An internal structure of the devices forming the spatial information delivery system will be described next. First, the partial spatial information generation device 1 will be described.

The spatial information storage 11 stores spatial information of target facility. The spatial information is transmitted to the spatial information storage 11 via the input/output I/F 13, or the like. Note that the spatial information storage 11 may store the generated partial spatial information.

The maintenance information storage 12 stores maintenance information. The maintenance information is transmitted to the maintenance information storage 12 via the input/output I/F 13, or the like. The maintenance information is information indicating restrictions to the object. For example, it is presumed that there is a room to which entry of the movement terminal 3 is prohibited within the facility. Further, there may be a room which requires inspection task of equipment within the room, but does not require cleaning task. Therefore, such restrictions are stored as the maintenance information. By creating the partial spatial information based on this maintenance information, it is possible to prevent the movement terminal 3 which acquires the partial spatial information from violating restrictions.

Note that the maintenance information may be expressed with binary of whether or not entry is allowed, or may be expressed with numerical values such as a security level associated with the spatial object. When the partial spatial information is generated, whether or not the spatial object is eliminated from the partial spatial information may be determined based on a degree of the numerical value.

The input/output I/F 13 receives the spatial information and the maintenance information to be recorded in each storage. Further, the input/output I/F 13 receives input relating to processing of the partial spatial information generation device 1. For example, commands of addition, updating and deletion of the spatial information or the maintenance information, such as a command for changing an attribute of the equipment included in the spatial information are input.

Further, the input/output I/F 13 may output a processing result relating to the input command. For example, the generated partial spatial information may be output. Alternatively, the spatial information extracted using an extraction command may be output.

The information acquirer 14 acquires the spatial information and the maintenance information respectively from the spatial information storage 11 and the maintenance information storage 12. The information acquirer 14 may extract information which satisfies conditions designated by the input/output I/F 13 or the partial spatial information generator.

The partial spatial information generator 15 generates partial spatial information for each partial spatial information transmission device 2. First, the partial spatial information generator 15 determines a spatial object to be included in the partial spatial information based on the locations of the partial spatial information transmission devices. Then, the partial spatial information generator 15 determines a path to be included in the partial spatial information based on the spatial object included in the partial spatial information. The partial spatial information generator 15 then generates partial spatial information by combining the determined spatial object and the determined path. That is, the partial spatial information generator 15 generates partial spatial information including the spatial object and the path.

The partial spatial information generator 15 determines to include the path, which is relating to the partial spatial information transmission device 2 corresponding to the generated partial spatial information and other partial spatial information transmission device existing within the spatial object included in the partial spatial information, in the partial spatial information.

Note that, in the case where the partial spatial information transmission device 2 is regarded as a node, the path included in the partial spatial information can be expressed as a path graph in which one node is connected to a plurality of nodes through paths. A node connected to the plurality of nodes through paths, that is, a hub node is the partial spatial information transmission device 2 corresponding to the generated partial spatial information.

Note that the partial spatial information may include other paths. Further, the partial spatial information includes information relating to paths included in the partial spatial information. The information relating to the path will be referred to as path information. That is, the partial spatial information generator 15 generates the partial spatial information including the path information.

The path information includes attribute information relating to the node and the path. Examples of the attribute information of the node include an ID and a location coordinate of the partial spatial information transmission device 2. Further, examples of the attribute information of the path include a path ID, a type of the path, an ID of the partial spatial information transmission device 2 existing at a termination of the path, a location coordinate list of pass points of the path, or the like.

The partial spatial information deliverer 16 performs communication with each partial spatial information transmission device 2 and delivers the partial spatial information to each partial spatial information transmission device 2. The partial spatial information deliverer 16 may perform other communication, or may transmit the partial spatial information directly to the movement terminal 3 in response to a request.

Figure 6:
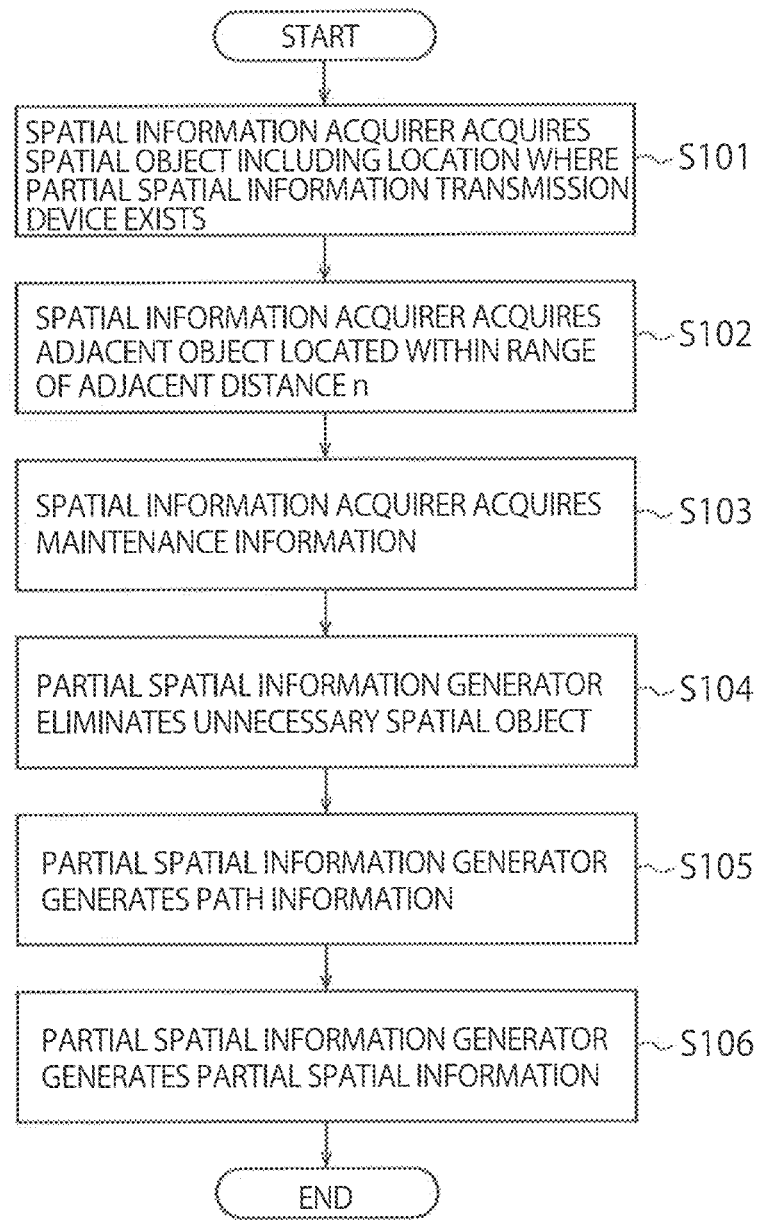
FIG. 6 is a diagram illustrating an example of a flowchart of partial spatial information generation processing.

Flow of processing for generating the partial spatial information will be described next. FIG. 6 is a diagram illustrating an example of a flowchart of partial spatial information generation processing.

Note that a timing at which the partial spatial information generation processing is performed may be freely determined as appropriate. The partial spatial information generation processing may be performed after an instruction is provided by the input/output I/F 13, may be performed based on a request from the partial spatial information transmission device 2, or the like, or may be regularly performed.

The information acquirer 14 acquires a spatial object which includes a location where the partial spatial information transmission device 2 exists from the spatial information stored in the spatial information storage 11 based on the location coordinate of the partial spatial information transmission device 2 (S101). The spatial object to be acquired may be physical closed space enclosed by a structure such as a wall or may be a partial region generated by dividing physical closed space. Further, the location coordinate of the partial spatial information transmission device 2 may be extracted from the spatial information, the partial spatial information transmission device 2 may be inquired about the location coordinate, or the location coordinate may be input from the input/output I/F 13.

Then, the information acquirer 14 acquires a spatial object existing within an adjacent distance n (where n is a predetermined positive integer) from the spatial object from the spatial information stored in the spatial information storage 11 based on the spatial object acquired in S101 (S102). The spatial object existing within the adjacent distance n will be referred to as an adjacent object. A distance between the spatial object and the adjacent object will be referred to as an adjacent distance.

The distance between the spatial object and the adjacent object is determined based on the number of spatial objects existing between the spatial object and the adjacent object. In the case where the adjacent object is located adjacent to the spatial object, that is, the number of spatial objects existing between the spatial object and the adjacent object is 0, the adjacent distance is 1. In the case where the adjacent object is located two objects away from the spatial object, that is, in the case where the number of spatial objects existing between the spatial object and the adjacent object is 1, the adjacent distance is 2. Relationship in which the spatial object is located adjacent to the adjacent object may be relationship in which the objects share a boundary of the space or may be relationship in which entry and exit through the opening portion is allowed.

In this manner, the partial spatial information generation device 1 judges whether a logical distance of the partial spatial information transmission device 2 associated with the generated partial spatial information with respect to each spatial object included in the spatial information is close based on the adjacent distance. The partial spatial information generation device 1 then includes a spatial object for which it is judged that the logical distance is close in the partial spatial information. By this means, amount of data corresponding to the partial spatial information becomes smaller than that corresponding to the spatial information. Note that if the adjacent distance n is greater, the amount of data corresponding to the generated partial spatial information becomes larger. Therefore, a magnitude of the adjacent distance n is appropriately determined while the amount of data corresponding to the partial spatial information is taken into account.

Figure 7:
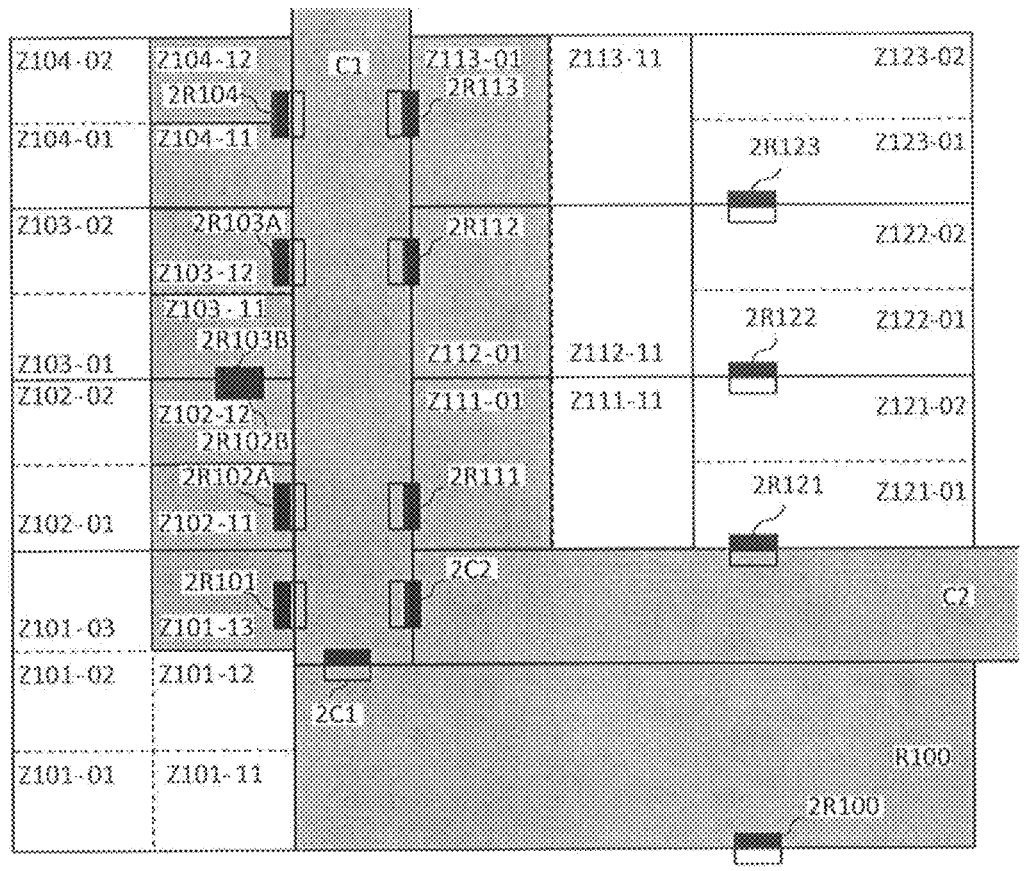
FIG. 7 is a diagram explaining an adjacent object.

FIG. 7 is a diagram explaining the adjacent object. The spatial objects illustrated with gray in FIG. 7 indicate spatial objects acquired by the information acquirer 14 based on the corridor C1. Note that it is assumed that the information acquirer 14 acquires adjacent objects whose adjacent distance is 1. In FIG. 7, the spatial objects to be acquired are set as the partial regions. Therefore, a partial region which is within the room that is adjacent to the corridor C1 but which is not adjacent to the corridor C1 is not acquired. For example, the information acquirer 14 acquires a partial region Z111-01, but does not acquire a partial region Z111-11 tough the partial regions are partial regions of the room R111 which is adjacent to the corridor C1.

Note that, while, in the above description, the spatial object to be acquired is determined based on the logical distance, the spatial object to be acquired may be determined using a method other than the above-described method. For example, it is also possible to determine a spatial object managed by each partial spatial information transmission device 2 in advance, and set the spatial object managed by each partial spatial information transmission device 2 as the spatial object to be acquired.

Description will return to explanation of the flowchart in FIG. 6. The information acquirer 14 then acquires maintenance information relating to the acquired spatial object and adjacent object from the maintenance information storage 12 (S103). The partial spatial information generator eliminates an unnecessary spatial object (S104).

For example, as illustrated in FIG. 7, the partial spatial information transmission device 2R113 and the partial spatial information transmission device 2C2 exist within adjacent objects with respect to the spatial object relating to the corridor C1.

However, a physical distance between the partial spatial information transmission device 2C1 and the partial spatial information transmission device 2R113 is extremely longer than a physical distance between the partial spatial information transmission device 2C1 and the partial spatial information transmission device 2C2. In this manner, if the partial spatial information is generated based on the adjacent objects, there is a case where the generated partial spatial information includes spatial information relating to an unnecessary portion. Therefore, the partial spatial information generator eliminates an unnecessary spatial object.

Figure 8:
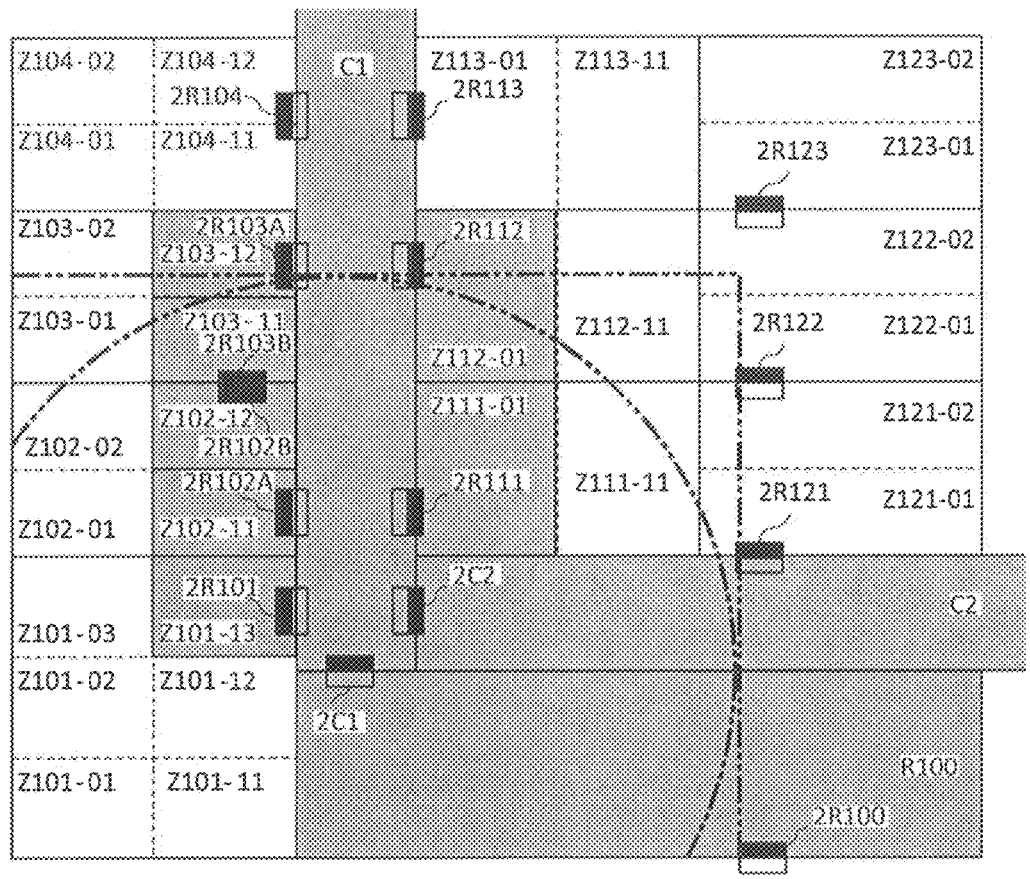
FIG. 8 is a diagram explaining a method for eliminating unnecessary spatial objects.

There are various possible methods for eliminating an unnecessary spatial object. For example, a spatial object whose physical distance from a reference point is equal to or greater than a threshold may be eliminated by being judged as far. FIG. 8 is a diagram explaining a method for eliminating an unnecessary spatial object. FIG. 8 illustrates a circle and a square which are centered around the partial spatial information transmission device 2C1 which is the reference point. The partial spatial information generator may judge whether the spatial object is unnecessary based on such a circle and a square. In FIG. 8, partial regions Z104-11, Z104-12 and Z113-01 do not overlap with the circle and the square at all. Therefore, the regions are eliminated from the partial spatial information. In this manner, the partial spatial information generator 15 may eliminate a spatial object for which it is judged that the physical distance from the reference point is far, from the partial spatial information. Note that the reference point may be the partial spatial information transmission device 2 or an object in the vicinity of the partial spatial information transmission device 2. Note that a method for judging that the distance is far is not limited to the above-described method. For example, while, in FIG. 8, a range is determined using a circle or a square, the shape for determining the range is not particularly limited, and may be a shape other than the circle and the square. Further, as described above, it may be judged that a spatial object which partially overlaps with the circle, or the like, for determining the range is necessary. Alternatively, it may be judged that a spatial object which wholly overlaps with the circle, or the like, for determining the range is necessary.

Further, the partial spatial information generator may eliminate information relating to the object judged as unnecessary from the partial spatial information based on the maintenance information. For example, the partial spatial information generator may extract a spatial object to which entry of the movement terminal 3 is restricted in the maintenance information and eliminate the extracted spatial object.

Further, the partial spatial information generator may eliminate information relating to an object which is judged to be unnecessary from the partial spatial information based on an attribute of the object. For example, the movement terminal 3 which performs cleaning work does not need to enter a spatial object which is set as unused in the attribute. Accordingly, the spatial object can be eliminated.

Figure 9:
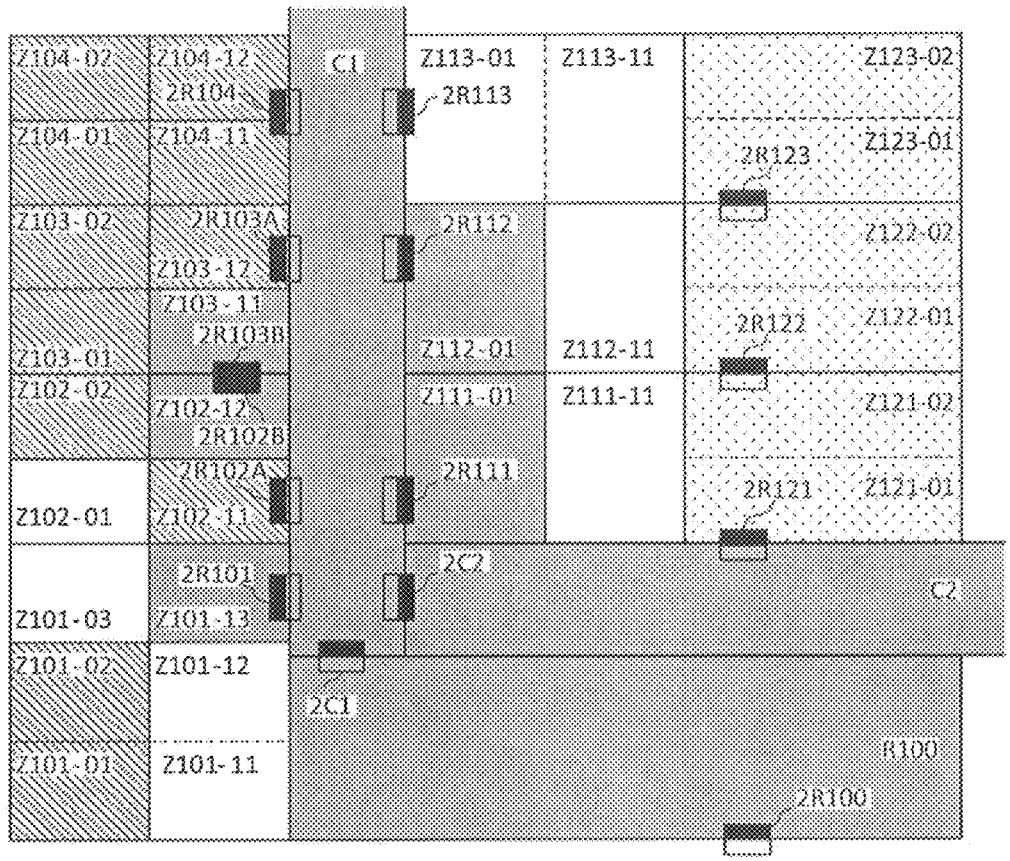
FIG. 9 is a diagram illustrating an example of spatial objects after the unnecessary spatial objects are eliminated.

FIG. 9 is a diagram illustrating an example of the spatial objects after unnecessary spatial objects are eliminated. Spatial objects with a diagonal pattern indicate spatial objects eliminated based on the maintenance information. Spatial objects with a dot pattern indicate spatial objects eliminated based on the attribute. In this manner, unnecessary objects are eliminated from the acquired spatial objects, and processing is then performed on the remaining spatial objects.

Further, while the partial spatial information is created for each partial spatial information transmission device 2, there can be a case where a spatial object to be eliminated differs according to the type, role, purpose, or the like, of the movement terminal 3. Therefore, a plurality of pieces of partial spatial information may be created for one partial spatial information transmission device 2.

For example, there can be a case where whether or not entering the room is allowed differs according to the role of the movement terminal 3. In such a case, maintenance information of the spatial object differs according to the role of the movement terminal 3. Accordingly, the partial spatial information may be created for each role of the movement terminal 3.

Description will return to explanation of the flowchart in FIG. 6. The partial spatial information generator generates path information based on the spatial object and the adjacent object acquired by the information acquirer 14 (S105). Note that a pass point of the path differs according to a method for generating the path. For example, the path may be generated by connecting the partial spatial information transmission devices 2 with a straight line. Alternatively, the path may be generated using a line segment connected from the spatial object or the center of the partial region to each partial spatial information transmission device 2. In this manner, as a result of the path being formed based on the spatial object or a specific location of the partial region, the path with which the movement terminal 3 passes through the specific location can be generated.

The partial spatial information generator 15 generates partial spatial information by combining a spatial object, an adjacent object of the spatial object, and the path information (S106). Therefore, the partial spatial information includes a spatial object within the adjacent distance n and path information within the spatial object within the adjacent distance n. Note that an adjacent object for which restriction is set is eliminated based on the maintenance information.

Figure 10:
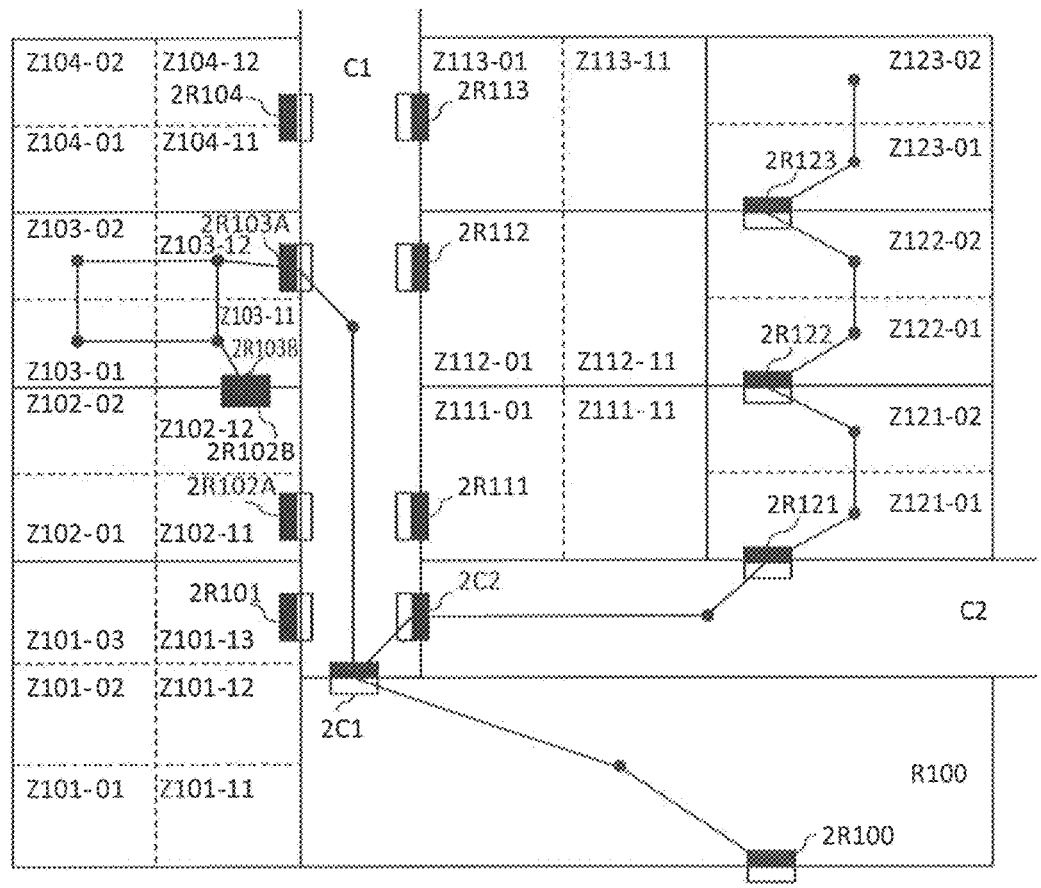
FIG. 10 is a diagram illustrating an example of spatial information in the case where partial spatial information is not generated.

FIG. 10 is a diagram illustrating an example of the spatial information in the case where the partial spatial information is not generated. FIG. 10 illustrates spatial objects on a certain floor illustrated in FIG. 4 and a path graph. Note that not all, but part of the path graph is illustrated. Note that it is assumed that a path of the generated path graph is generated so as to pass through the center of the spatial object.

The spatial information in FIG. 10 includes all spatial objects on the floor. Further, the path graph includes paths across a plurality of spatial objects.

Figure 11:
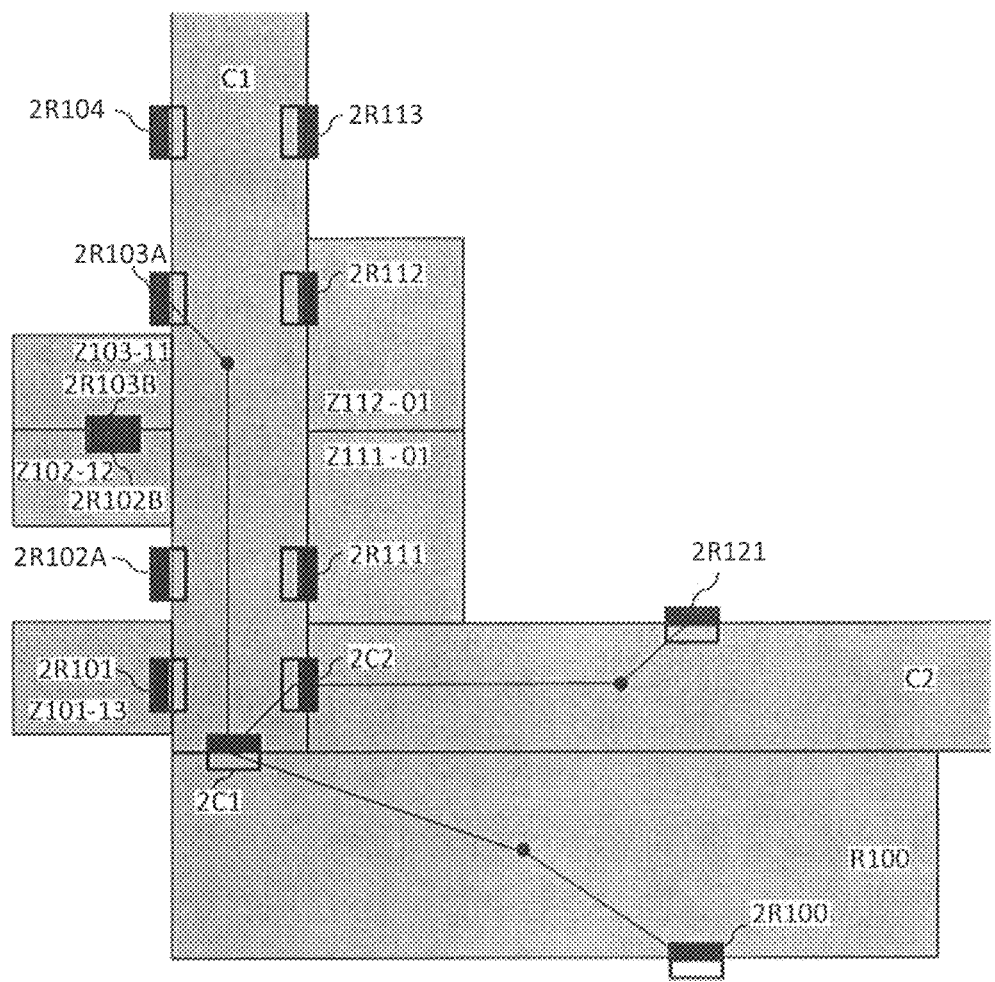
FIG. 11 is a diagram illustrating an example of the partial spatial information.

FIG. 11 is a diagram illustrating an example of the partial spatial information. The partial spatial information in FIG. 11 is specialized for the partial spatial information transmission device 2C1. Compared to the spatial information in FIG. 10, no spatial object judged as unnecessary is present. Further, the path graph is also part of the path graph illustrated in FIG. 10. For example, while the spatial object relating to the partial region Z103-11 is included in the partial spatial information, the spatial object relating to the partial region Z103-12 is not included in the partial spatial information because the spatial object relating to the partial region Z103-12 is judged as unnecessary based on the maintenance information. Therefore, the path graph within the room R103 is eliminated from the partial spatial information because a path for entering the partial region Z103-11 does not exist.

In this manner, each of the individually generated partial spatial information is specialized for the partial spatial information transmission device 2 which transmits the partial spatial information, and each amount of data corresponding to the partial spatial information is reduced compared to the spatial information. By this means, it is possible to suppress capacity of the partial spatial information transmission device 2, and suppress processing load and power consumption of the movement terminal 3.

Further, it is not necessary to perform continuous marking on the path during movement and create peripheral map as in an SLAM (Simultaneous Localization and Mapping) method, because the partial spatial information includes an object around a movement path.

By this means, it is possible to simplify a sensor built in the movement terminal 3 and suppress introduction and running cost.

Note that the above-described flow is an example, and, order of the processing, or the like, may differ if the same result can be generated. For example, while the above description has been provided assuming that processing is performed for each partial spatial information transmission device 2, the information acquirer 14 may perform processing from S101 to S103 on all the partial spatial information transmission devices 2 and, then, the partial spatial information generator 15 may perform processing from S104 to S105 on each partial spatial information transmission device 2. Further, in the case where the maintenance information is not taken into account, processing relating to the maintenance information, such as S103 is skipped.

The partial spatial information transmission device 2 will be described next.

The partial spatial information storage 21 stores the partial spatial information transmitted from the partial spatial information generation device 1. Note that, while it is assumed that the transmitted partial spatial information is partial spatial information corresponding to the own partial spatial information transmission device 2, partial spatial information of other partial spatial information transmission device 2 may be stored.

The partial spatial information updater 22 acquires partial spatial information corresponding to the own partial spatial information transmission device 2 from the partial spatial information generation device 1 and updates the partial spatial information stored in the partial spatial information storage 21. Note that the partial spatial information storage 21 only has to manage the latest partial spatial information, and may continue to store or delete old partial spatial information.

Note that the partial spatial information updater 22 may acquire a request from the movement terminal 3 and request delivery of the partial spatial information to the partial spatial information generation device 1 based on the request. For example, there can be a case where the user has the movement terminal 3 and requests the latest partial spatial information. In this case, the request is transmitted to the partial spatial information generator 15 via the partial spatial information deliverer 16 of the partial spatial information generation device 1. The partial spatial information generator 15 executes the partial spatial information generation processing illustrated in FIG. 6 and then transmits newly generated partial spatial information to the partial spatial information transmission device 2 which makes the request. Note that it is only necessary to generate partial spatial information relating to the partial spatial information transmission device 2 which makes the request.

The partial spatial information transmitter 23 transmits partial spatial information corresponding to the own partial spatial information transmission device 2 from the partial spatial information storage 21. Transmission of the partial spatial information may be always performed, or may be performed in a time slot or a period during which the movement terminal 3 moves. For example, if the movement terminal 3 performs maintenance work at night, transmission of the partial spatial information does not have to be performed during the day.

Further, the partial spatial information transmission device 2 may share information with other partial spatial information transmission devices 2 or may coordinate with other partial spatial information transmission devices 2. For example, the partial spatial information updater 22 may regularly confirm operation states of other partial spatial information transmission devices 2. Whether or not other partial spatial information transmission devices 2 operate may be confirmed through a publicly known network manager such as an ICMP (Internet Control Message Program) and an SNMP (Simple Network Management Protocol).

For example, a case will be considered where, in the case where a partial spatial information transmission device 2B which is one of the partial spatial information transmission devices 2 breaks down, a partial spatial information transmission device 2A which is one of the partial spatial information transmission devices 2 continues to provide partial spatial information including a path to the partial spatial information transmission device 2B. There can be a case where movement terminal 3 which acquires the partial spatial information from the partial spatial information transmission device 2A is headed to the partial spatial information transmission device 2B. Even if the movement terminal 3 reaches the partial spatial information transmission device 2B, the movement terminal 3 cannot move henceforth because the movement terminal 3 cannot acquire partial spatial information in the vicinity of the partial spatial information transmission device 2B. In order to prevent such a circumstance, in the case where the partial spatial information transmission device 2A detects a failure of the partial spatial information transmission device 2B, it is preferable to eliminate path information to the partial spatial information transmission device 2B from the partial spatial information.

Therefore, in the case where the partial spatial information transmission device 2 which does not operate is detected, the partial spatial information updater 22 may update the partial spatial information stored in the partial spatial information storage 21.

For example, the partial spatial information updater 22 may eliminate a spatial object relating to the partial spatial information transmission device 2 which does not operate from the partial spatial information. Further, the partial spatial information updater 22 may eliminate a path relating to the partial spatial information transmission device 2 which does not operate from the partial spatial information.

Note that, in the case where it is judged that another partial spatial information transmission devices 2 included in the partial spatial information does not operate, the partial spatial information updater 22 may request regeneration of the partial spatial information to the partial spatial information generation device 1. In this case, the partial spatial information generation device 1 manages operation states of the partial spatial information transmission devices 2 so that the partial spatial information to be generated does not include partial spatial information relating to the partial spatial information transmission device 2 which does not operate.

However, if the partial spatial information generation device 1 manages a number of partial spatial information transmission devices 2, management load increases. Further, in the case where unforeseen circumstances such as electric power outage of the facility occur due to an earthquake, or the like, there is a risk that excessive load due to a number of inquiries to the partial spatial information generation device 1 may stop the partial spatial information transmission device 2. On the other hand, if the partial spatial information transmission device 2 is configured to be able to coordinate with part of other partial spatial information transmission devices 2, load is distributed, and availability of the spatial information delivery system is increased.

Figure 12:
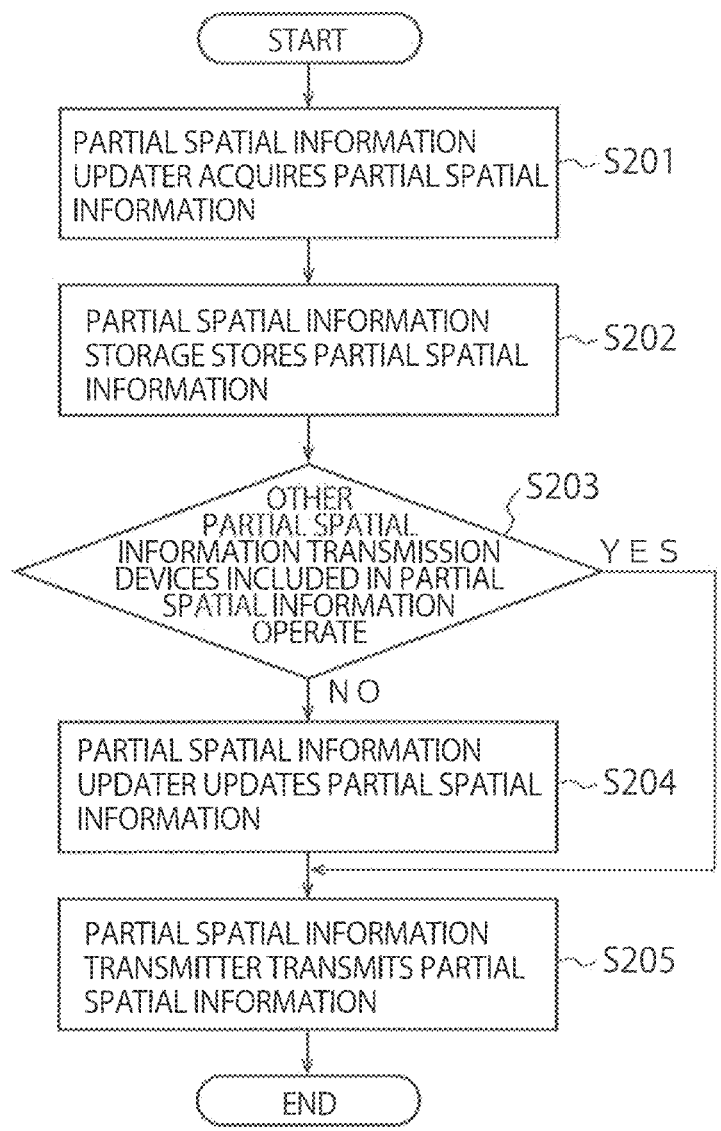
FIG. 12 is a diagram illustrating an example of a flowchart of schematic processing of the partial spatial information transmission device.

Flow of processing of the partial spatial information transmission device 2 will be described next. FIG. 12 is a diagram illustrating an example of a flowchart of schematic processing of the partial spatial information transmission device 2.

The partial spatial information updater 22 acquires partial spatial information from the partial spatial information generation device 1 (S201), and the partial spatial information storage 21 stores the acquired partial spatial information (S202). The partial spatial information updater 22 then confirms operation states of other partial spatial information transmission devices 2 included in the stored partial spatial information, and, in the case where it is judged that other partial spatial information transmission devices 2 operate (Yes in S203), the processing proceeds to S205. In the case where it is judged that other partial spatial information transmission devices 2 do not operate (No in S203), the partial spatial information updater 22 updates the partial spatial information while eliminating information relating to the partial spatial information transmission device 2 which is judged as not operating (S204). The partial spatial information transmitter 23 starts transmitting new partial spatial information (S205). The flow of the schematic processing of the partial spatial information transmission device 2 has been described above.

Note that, in this flow, the operation states of other partial spatial information transmission devices 2 included in the partial spatial information are confirmed, but the processing in S203 and S204 does not have to be performed in the case where the operation states are not confirmed.

Further, while the partial spatial information transmitter 23 transmits the partial spatial information in the processing in S205, the partial spatial information transmitter 23 may continue to transmit partial spatial information before being updated also during the processing from S201 to S204.

The movement terminal 3 will be described next. Here, a structure in the case where the movement terminal 3 autonomously moves will be described.

The partial spatial information receiver (information communicator) 31 receives the partial spatial information transmitted by the partial spatial information transmission device 2. Note that, while the partial spatial information receiver 31 may only receive the partial spatial information, the partial spatial information receiver 31 may request the partial spatial information, or the like, to the partial spatial information transmission device 2.

The partial spatial information updater 32 updates the partial spatial information storage 33 based on the received partial spatial information.

The partial spatial information storage 33 stores the partial spatial information. The stored partial spatial information is referred to by each component of the movement terminal 3. Further, the partial spatial information storage 33 may store information such as a path through which the movement terminal 3 moves.

An object recognizer 34 recognizes a spatial object in which the movement terminal 3 exists based on the spatial object and the locations of the partial spatial information transmission devices which are included in the partial spatial information. Further, the object recognizer 34 also recognizes objects within the spatial object based on identification information for identifying objects included in the partial spatial information. The identification information can include, for example, an ID of the partial spatial information transmission device, information relating to appearance, or the like.

A location/orientation corrector 35 recognizes an error between an estimated current self-location and an actual self-location and an error between an estimated orientation and an actual orientation. Then, the location/orientation corrector 35 corrects the location and the orientation of the movement terminal 3. While the movement terminal 3 estimates a current location and orientation for movement, an error inevitably occurs between the estimation value and the actual value in the process of movement, communication and measurement. The location/orientation corrector 35 recognizes the error based on objects around the movement terminal 3.

Specifically, the location/orientation corrector 35 calculates a distance and orientation (angle) to an outside of the object recognized by the object recognizer 34 based on an image around the movement terminal 3. For example, the distance and the orientation may be calculated based on a distortion amount of the shape of the outside of the object. The self-location and the orientation are estimated based on the calculated distance, the calculated orientation, and the location of the object. Note that, it is assumed that the image around the movement terminal 3 is acquired by a sensor built in the movement terminal 3 and can be acquired by each component of the movement terminal. Further, while it is assumed that a target object as a reference is the partial spatial information transmission device when the location/orientation corrector 35 performs correction, the target object is not particularly limited.

The movement path setter 36 selects one partial spatial information transmission device 2 as a movement destination out of the partial spatial information transmission devices 2 included in the partial spatial information. A selection method may be judged based on a destination of the movement terminal 3, a role of the movement terminal 3, priority that the partial spatial information transmission device 2 is selected, or the like. The movement path setter 36 selects a path whose movement origin is the partial spatial information transmission device 2 which acquires the partial spatial information and whose movement destination is the selected partial spatial information transmission device 2 among a plurality of paths. In the case where there are a plurality of paths, the path may be selected based on a movement distance, a pass point, surrounding facility, or the like.

A measurement information acquirer 37 acquires data measured by a sensor built in the movement terminal 3. The measurement information acquirer 37 itself may be a sensor, or the measurement information acquirer 37 may be connected to the sensor so as to perform communication or may be electrically connected to the sensor. A type of the sensor is not particularly limited. The sensor may be an acceleration sensor or an angular velocity sensor. Further, data to be measured may be a numerical value or an image. It is also possible to mount different types of sensors.

The location/orientation calculator 38 calculates the location and the orientation of the movement terminal 3 based on the measurement data acquired by the measurement information acquirer 37. Note that, actually, the location and the orientation calculated from measurement results of the acceleration sensor and the angular velocity sensor are a location and orientation relative to the previous measurement results. Therefore, the location/orientation calculator 38 calculates a current location and orientation by accumulating locations and orientation calculated until now since the movement is started.

The movement adjuster 39 adjusts movement of the movement terminal 3 based on the current location and orientation calculated by the location/orientation calculator 38 and the path information relating to the path through which the movement terminal 3 is moving, and makes the movement terminal 3 move on the path. For example, the movement terminal 3 may move to a location at which the movement terminal 3 is expected to exist at the present moment. Alternatively, the orientation of the movement terminal 3 may be changed so that the movement terminal 3 moves to one point on the path in a movement direction. By this means, the movement terminal 3 can return to the original location even if the movement terminal 3 moves to a location deviating from the path. Note that the actual location of the movement terminal 3 may be adjusted by controlling wheels, or the like, of the movement terminal 3 using a publicly known movement control method.

The processing of the movement terminal 3 will be described next. Description will be provided while the processing is divided into processing performed before the movement terminal 3 starts movement and processing after the movement terminal 3 starts movement.

Figure 13:
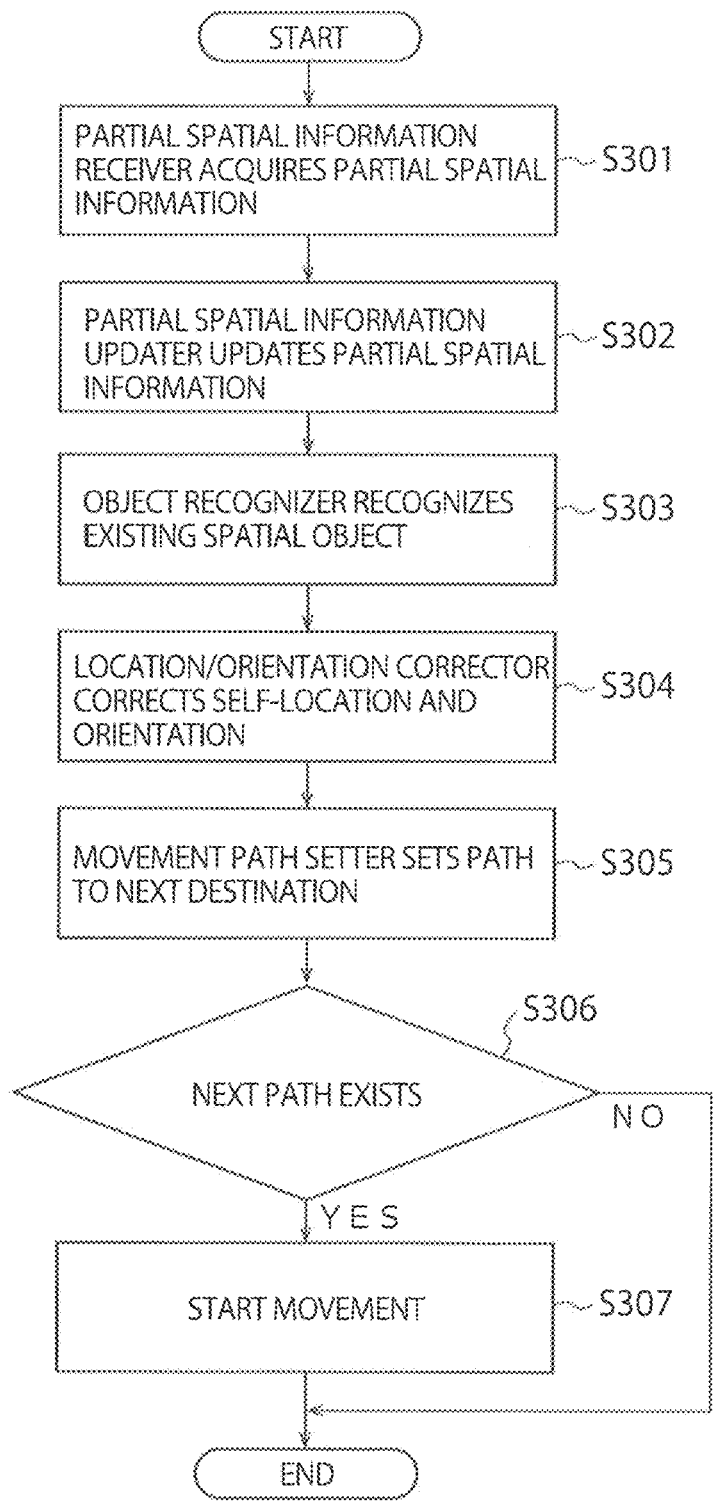
FIG. 13 is a diagram illustrating an example of a flowchart of schematic processing of a movement terminal before the movement terminal starts movement.

FIG. 13 is a diagram illustrating an example of a flowchart of schematic processing of the movement terminal 3 before the movement terminal 3 starts movement. First, the partial spatial information receiver 31 of the movement terminal 3 acquires the partial spatial information from the partial spatial information transmission device 2 in the vicinity before the movement terminal 3 starts movement (S301). The partial spatial information updater 32 updates the partial spatial information within the partial spatial information storage 33 (S302). Note that, it is assumed here that a location where the movement terminal 3 is accommodated falls within a range where the partial spatial information transmission device 2 provides information. That is, it is assumed that, before the movement terminal 3 starts movement, the partial spatial information receiver 31 can acquire the partial spatial information. Note that the movement terminal 3 may search the partial spatial information transmission device 2 by randomly moving before starting movement.

The object recognizer 34 recognizes the spatial object in which the movement terminal 3 exists based on the updated partial spatial information (S303). Further, the location/orientation corrector 35 corrects and sets the self-location and the orientation of the movement terminal 3 in the recognized spatial object (S304). Note that, while, in the case where the error is corrected using a geomagnetic scheme, there is a constraint that the error cannot be corrected around the facility which disorder a magnetic field, it is possible to correct an error also around the facility which disorder a magnetic field with this scheme.

The movement path setter 36 selects one partial spatial information transmission device 2 out of the partial spatial information transmission devices 2 included in the partial spatial information as a movement destination and sets the path (S305). By this means, a path from the partial spatial information transmission device corresponding to the acquired partial spatial information to another partial spatial information transmission device included in the partial spatial information is set. In the case where the next path does not exist, such as in the case where there is no partial spatial information transmission device 2 included in the partial spatial information (No in S306), the processing is finished. In the case where there is the next path (Yes in S306), the movement terminal 3 starts movement (S307).

Figure 14:
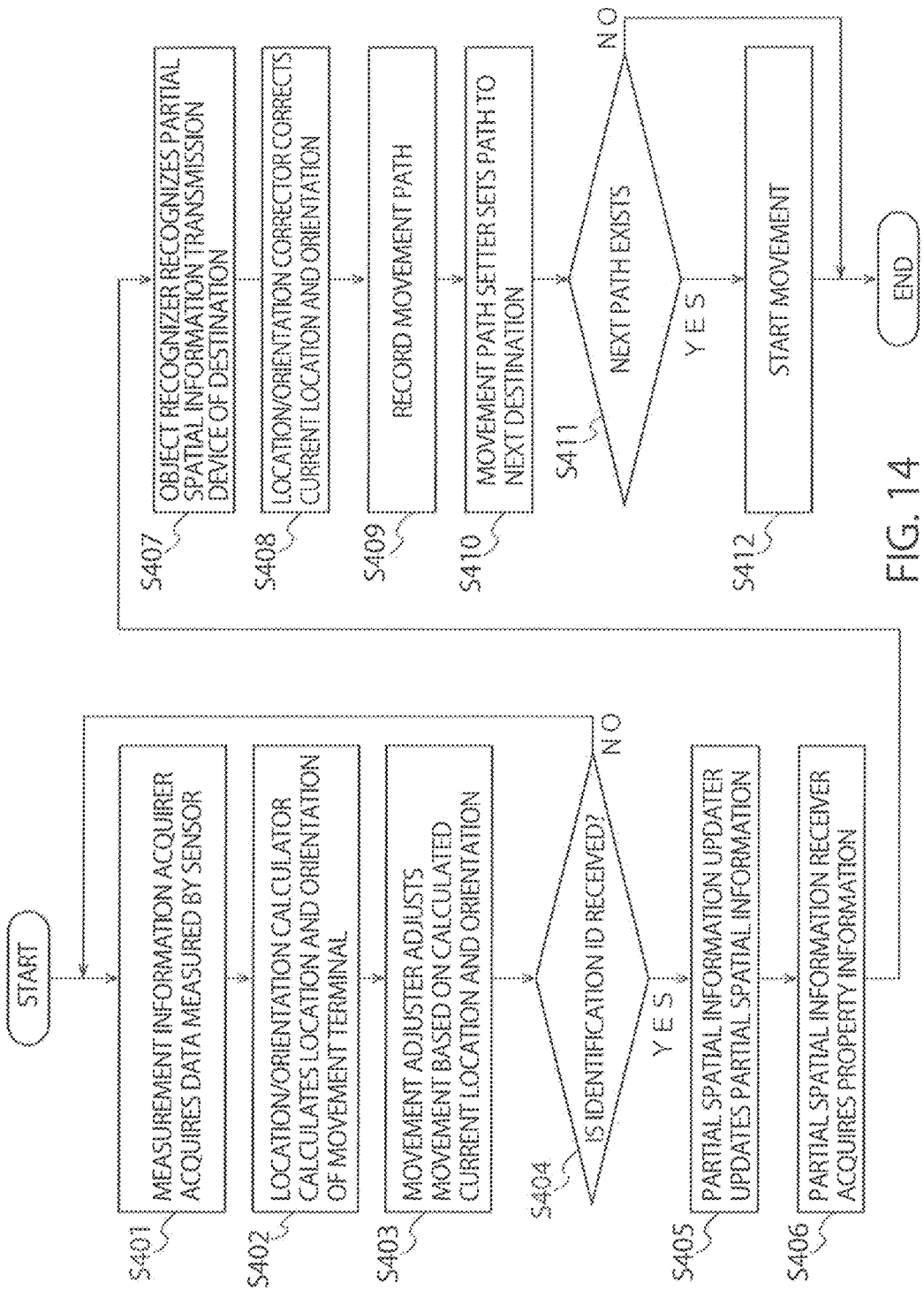
FIG. 14 is a diagram illustrating an example of a flowchart of schematic processing of the movement terminal after the movement terminal starts movement.

FIG. 14 is a diagram illustrating an example of a flowchart of schematic processing of the movement terminal 3 after the movement terminal 3 starts movement. The measurement information acquirer 37 acquires the measurement data using a sensor, or the like, built in the movement terminal 3 (S401). The location/orientation calculator 38 calculates the location and the orientation of the movement terminal 3 based on the measurement data (S402).

The movement adjuster 39 adjusts the movement based on the current location and orientation calculated by the location/orientation calculator 38 (S403). The processing from S401 to S403 is repeated until the partial spatial information receiver 31 acquires an identification ID of the partial spatial information transmission device 2 which is the movement destination (No in S404). In the case where the partial spatial information receiver 31 acquires the identification ID of the partial spatial information transmission device 2 which is the movement destination (Yes in S404), the partial spatial information updater 32 updates the partial spatial information using the partial spatial information from the partial spatial information transmission device 2 which is the movement destination (S405).

Further, the partial spatial information receiver 31 acquires property information of the partial spatial information transmission device 2 other than the partial spatial information (S406). The property information of the partial spatial information transmission device 2 is information which indicates property such as an attribute, characteristics, or the like, of the partial spatial information transmission device 2, and is used by the movement terminal 3 to recognize the location of the partial spatial information transmission device 2. For example, the property information includes a wavelength of visible light emitted by the partial spatial information transmission device 2 or information regarding appearance of the partial spatial information transmission device 2. The information regarding appearance is Information regarding a form including a shape, a pattern and color of the partial spatial information transmission device 2.

The object recognizer 34 recognizes the partial spatial information transmission device 2 which is the destination, based on the image around the movement terminal 3 and the property information of the partial spatial information transmission device 2 (S407).

The location/orientation corrector 35 calculates a distance and an angle to the outside of the partial spatial information transmission device 2 based on the image of the partial spatial information transmission device 2. The location/orientation corrector 35 then corrects a current location and orientation of the movement terminal 3 based on the calculated distance and angle (S408).

The location/orientation corrector 35 or the movement adjuster 39 records an actual movement path through which the movement terminal 3 moves as movement history (S409). As the movement history, a path ID, a pass point, corrected location coordinate and value of the orientation, or the like, may be recorded. Further, the movement history may be stored in the partial spatial information storage 33 of the movement terminal 3 or may be transmitted to the partial spatial information generation device 1 and the partial spatial information transmission device 2.

As with the schematic process of the movement terminal 3 before the movement terminal 3 starts movement, the movement path setter 36 sets a path to the next destination (S410). In the case where the next path does not exist (No in S411), the processing is finished. In the case where the next path exists (Yes in S412), the movement is started (S412). Then, the processing of S401 is performed again. In this manner, autonomous movement of the movement robot is made possible. The flow of the schematic processing of the movement terminal 3 after the movement terminal 3 starts movement has been described above.

Figure 15:
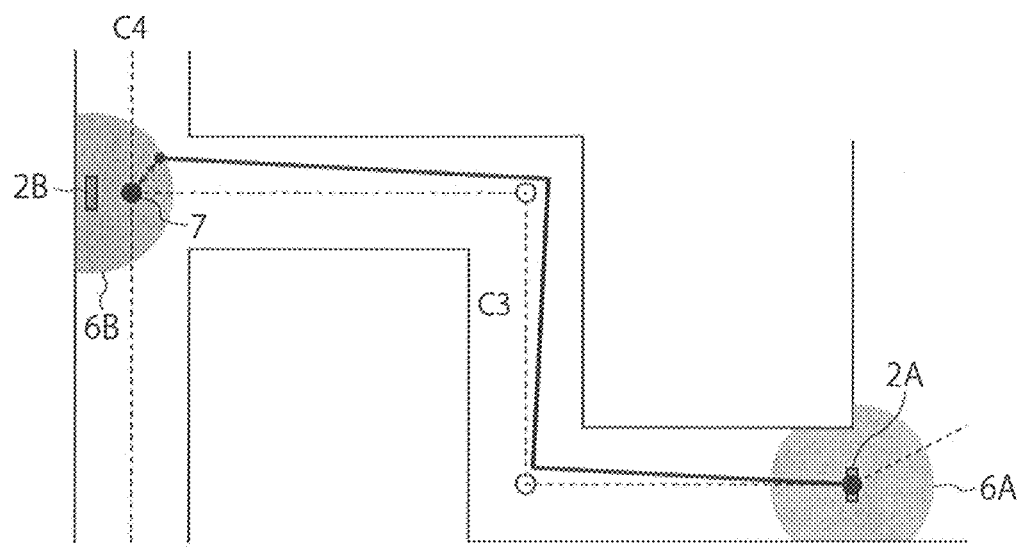
FIG. 15 is a diagram illustrating an example of a trajectory of movement of the movement terminal.

FIG. 15 is a diagram illustrating an example of a trajectory of the movement of the movement terminal 3. It is assumed that the movement terminal 3 moves from the partial spatial information transmission device 2A to the partial spatial information transmission device 2B. A dashed line indicates the path. It is assumed that the path from the partial spatial information transmission device 2A to the partial spatial information transmission device 2B is on the corridor C3. The corridor C3 has two corners. At the corners, pass points are defined, and setting is made so that the movement terminal 3 passes through the pass points. Further, a circle 6A centered around the partial spatial information transmission device 2A and a circle 6B centered around the partial spatial information transmission device 2B indicate ranges where each partial spatial information transmission device provides partial spatial information.

The solid line indicates the trajectory of the movement of the movement terminal 3. As indicated with the trajectory, while the movement terminal 3 tries to move on the path, as the movement terminal 3 moves, there arises a locational displacement between an actual self-location and the path. Therefore, processing from S401 to S403 illustrated in FIG. 14 is required.

By the movement terminal 3 moving while correcting the location, the movement terminal 3 can reach the range 6B where the partial spatial information transmission device 2B provides the partial spatial information. Adversely, in the case where the movement terminal 3 does not correct the location, even though the movement terminal 3 moves by a distance which is the same as the length of the path, the movement terminal 3 cannot reach the range 6B where the partial spatial information is provided. In this case, a situation that the movement terminal 3 stops can occur.

Then, after the processing from S405 to S409 of the flow illustrated in FIG. 14 is performed, the movement terminal 3 determines the partial spatial information transmission device 2 which is the next destination, and starts movement to the new destination (from S410 to S412). The movement terminal 3 then reaches the target destination by going through a plurality of partial spatial information transmission devices 2. In this manner, even if the partial spatial information acquired from the partial spatial information transmission device 2 does not include spatial information to the destination, since the partial spatial information includes spatial information to the partial spatial information transmission device 2 which the movement terminal 3 goes through, the movement terminal 3 can reach the target destination by going through a plurality of partial spatial information transmission devices 2.

Note that, in the processing in S408, while the location/orientation corrector 35 corrects a current location and orientation of the movement terminal 3, the correction may be updating of the coordinate of the self-location. Alternatively, the correction may be performed so that the movement terminal 3 moves to a location 7 which the movement terminal 3 is originally scheduled to reach. In this manner, accurate movement of the movement terminal 3 is made possible.

As described above, according to an embodiment of the present invention, the partial spatial information generation device 1 generates partial spatial information which is part of spatial information relating to the facility and which is specific to each of the partial spatial information transmission devices 2, for each partial spatial information transmission device 2 based on the locations of the partial spatial information transmission devices 2. Each partial spatial information transmission device 2 transmits partial spatial information corresponding to the own partial spatial information transmission device 2. By this means, the partial spatial information transmitted by each partial spatial information transmission device 2, whose amount of data is smaller than that of the spatial information, includes spatial information necessary for the partial spatial information processing device. Therefore, it is expected to reduce processing load and power consumption of the partial spatial information processing device.

Further, from the above description, it is expected to downsize the movement terminal 3, reduce manufacturing cost, or the like. If the movement terminal 3 is a robot, or the like, which performs maintenance within the facility, it is possible to automate maintenance work and make maintenance work more efficient.

Further, by using maintenance information and an attribute of an object, it is possible to secure security of the facility. Further, the partial spatial information transmission device 2 can also suppress capacity of the storage which stores the partial spatial information, so that it is possible to downsize the partial spatial information transmission device 2.

Further, if the partial spatial information transmission device 2 can be mounted on emergency light, so that the partial spatial information transmission device 2 can transmit partial spatial information also in an emergency, the movement terminal 3 can automatically evacuate from the facility in an emergency. It is, for example, assumed that, it is set such that the movement terminal 3 automatically starts movement in the case where the movement terminal 3 detects occurrence of an earthquake disaster. Further, it is assumed that, as illustrated in FIG. 2, the partial spatial information transmission device 2 continues to transmit partial spatial information by being connected to a battery which supplies power even if a power supply system within the facility is stopped. Further, it is assumed that, as described above, the partial spatial information transmission device 2 transmits partial spatial information while deleting paths to other partial spatial information transmission devices 2 which do not operate. By this means, the movement terminal 3 can reach outside by going through partial spatial information transmission devices 2 which operate while avoiding partial spatial information transmission devices 2 which stop due to the earthquake disaster.

Note that each processing of the partial spatial information generation device 1, the partial spatial information transmission device 2 and the movement terminal 3 in the above-described embodiment can be implemented with software (program). Therefore, the above-described embodiment can be realized by, for example, causing a processor mounted on a computer device to execute a program using a general-purpose computer device as basic hardware.

Figure 16:
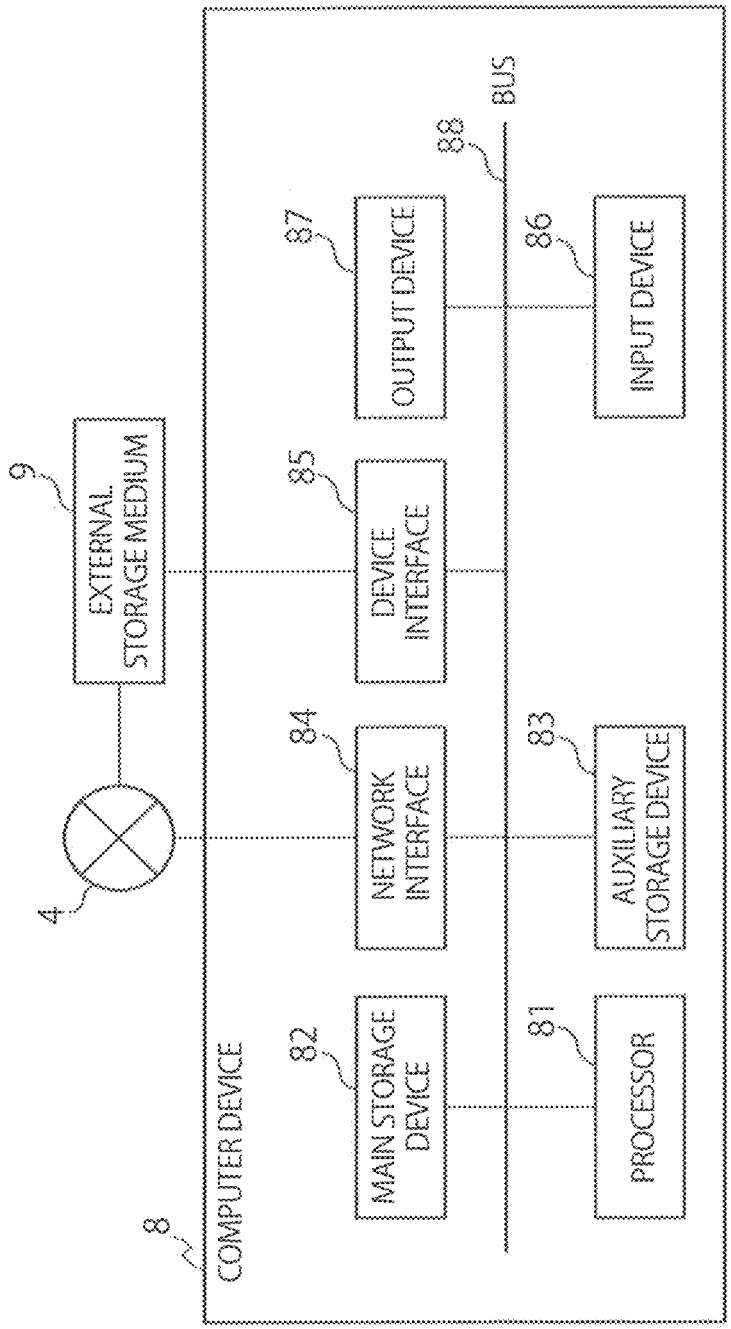
FIG. 16 is a block diagram illustrating an example of a hardware configuration of devices forming a spatial information delivery system according to an embodiment of the present invention.

FIG. 16 is a block diagram illustrating an example of a hardware configuration of devices which form the spatial information delivery system according to an embodiment of the present invention. The partial spatial information generation device 1, a plurality of partial spatial information transmission devices 2 and the movement terminal (partial spatial information processing device) 3 which form the spatial information delivery system can be implemented as a computer device 8 which includes a processor 81, a main storage device 82, an auxiliary storage device 83, a network interface 84, a device interface 85, an input device 86 and an output device 87, and in which these are connected via a bus 88. Note that each component of the hardware may be provided one each as illustrated in FIG. 16 or a plurality of components may be provided.

The partial spatial information generation device 1, the partial spatial information transmission devices 2 or the movement terminal 3 in the present embodiment may be implemented by a program to be executed at each device being installed in advance in the computer device 8, or the program may be stored in a storage medium such as a CD-ROM or distributed via a network, and implemented by the program being installed in the computer device 8 as appropriate.

The processor 81 is an electronic circuit including a control device and an arithmetic device of the computer. The processor 81 performs arithmetic processing based on data or a program input from each device of an internal configuration of the computer device 8 and outputs an arithmetic result or a control signal to each device, or the like. Specifically, the processor 81 implements processing of components of each device by executing an OS (operating system) and application stored in the main storage device 82 or the auxiliary storage device 83.

Note that the term "processor" should be broadly interpreted, and includes a CPU (Central Processing Unit), a microprocessor, or the like. Further, the processor may include processors for assisting the processor, such as a digital signal processor, a graphics processor and a processor for peripheral devices.

The main storage device 82 which is a memory device which temporarily stores a command to be executed by the processor 81, various kinds of data, or the like, may be a volatile memory such as a DRAM or a non-volatile memory such as an MRAM.

The auxiliary storage device 83 which is a storage device which permanently stores a program, data, or the like, for example, Includes a hard disk, a SAN (Storage area network), an optical disk, a flash memory, a magnetic tape, or the like.

The network interface 84 is an interface for connecting to the communication network 4 in a wired or wireless manner. As a network adapter 44, one which complies with existing communication standards may be used. Components which perform communication at each device are implemented through the network interface 84.

The device interface 85 is an interface for connecting to an external storage medium 9. Connection standards are not particularly limited.

The external storage medium 9 is connected to the computer device 8 via the network interface 84 and the device interface 85. The external storage medium 9 may be an arbitrary recording medium such as an HDD, a CD-R, a CD-RW, a DVD-RAM, a DVD-R and an NAS (Network Attached Storage).

The storage of each device is implemented by the main storage device 82, the auxiliary storage device 83, the external storage medium 9 or combination thereof. For example, the whole storage may be implemented with one or a plurality of the main storage device 82, the auxiliary storage device 83 and the external storage medium 9. Further, part of data and the other part of data to be stored in the storage may be stored at different locations. For example, part of data to be stored in the storage may be stored in the auxiliary storage device 83, and the other part of data may be stored in the external storage medium 9. Further, in the case where the storage is implemented at the auxiliary storage device 83, the storage may be also implemented at the main storage device 82 by data stored in the auxiliary storage device 83 being copied to the main storage device 82.

The input device 86 includes an input device such as a keyboard, a mouse and a touch panel. An operation signal through operation of the input device from the input device 86 is output to the processor 81. The output device 87 may be, for example, a display device for displaying an image or a device for outputting sound, or the like. For example, examples of the output device 87 include an LCD (Liquid Crystal Display), a CRT (Cathode Ray Tube), a PDP (Plasma Display Panel), a speaker, or the like, the output device 87 is not limited to these. The input/output I/F 13 of the partial spatial information generation device 1 is implemented with the input device 86 and the output device 87.

Note that the input device 86 or the output device 87 may be connected to the computer device 8 via the network interface 84 or the device interface 85.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A spatial information delivery system comprising:
a partial spatial information generation device; and
a plurality of partial spatial information transmission devices existing within a facility,
wherein the partial spatial information generation device extracts partial spatial information from spatial information relating to the facility for each of the partial spatial information transmission devices based on locations of the partial spatial information transmission devices, the partial spatial information being part of the spatial information and specific to each of the partial spatial information transmission devices, and
each partial spatial information transmission device transmits the partial spatial information corresponding to the specific partial spatial information transmission device.

2. The spatial information delivery system according to claim 1,
wherein the partial spatial information generation device includes a path between a partial spatial information transmission device corresponding to the partial spatial information and other partial spatial information transmission devices existing within a spatial object included in the partial spatial information, in the partial spatial information.

3. The spatial information delivery system according to claim 1,
wherein each partial spatial information transmission device transmits the partial spatial information or information for receiving the partial spatial information using a push-type communication scheme.

4. The spatial information delivery system according to claim 1,
wherein the partial spatial information generation device includes a spatial object for which it is judged that a logical distance to the partial spatial information transmission device associated with the partial spatial information to be generated is equal to or less than a threshold among spatial objects included in the spatial information, in the partial spatial information,
wherein the logical distance is the number of other spatial objects existing between the partial spatial information transmission device and the spatial object.

5. The spatial information delivery system according to claim 1,
wherein the partial spatial information generation device eliminates a spatial object for which it is judged that a physical distance from a reference point is equal to or greater than a threshold from the partial spatial information.

6. The spatial information delivery system according to claim 1,
wherein the partial spatial information generation device eliminates information relating to an object which is judged as unnecessary based on maintenance information relating to objects existing in the facility from the partial spatial information.

7. The spatial information delivery system according to claim 1,
wherein the spatial information includes attributes of objects existing in the facility, and
the partial spatial information generation device eliminates information relating to an object judged as unnecessary based on the attributes from the partial spatial information.

8. The spatial information delivery system according to claim 1,
wherein the partial spatial information transmission device confirms operation states of other partial spatial information transmission devices, and eliminates a path relating to a partial spatial information transmission device which does not operate among the other partial spatial information transmission devices from the partial spatial information.

9. The spatial information delivery system according to claim 1,
wherein the partial spatial information transmission device is connected to a battery which supplies power in the case where a power supply system within the facility is stopped.

10. The spatial information delivery system according to claim 2, further comprising:
a partial spatial information processing device configured to determine a path for moving from a first partial spatial information transmission device which is one of the plurality of partial spatial information transmission devices to a second partial spatial information transmission device which is one of the partial spatial information transmission devices based on the path included in the partial spatial information.

11. The spatial information delivery system according to claim 10, further comprising:
a movement device configured to move along a path determined by the partial spatial information processing device,
wherein the movement device comprises:
a sensor;
a recognizer configured to recognize a target object from objects recognized by the sensor based on identification information for identifying objects included in the partial spatial information; and
a location/orientation corrector configured to correct a current location and orientation of the movement device based on orientation and a distance to the target object and a location of the target object.

12. A spatial information delivery method for delivering spatial information by a plurality of partial spatial information transmission devices existing within a facility, the spatial information delivery method comprising:
extracting partial spatial information from spatial information relating to the facility for each of the partial spatial information transmission devices based on locations of the partial spatial information transmission devices, the partial spatial information being part of the spatial information and specific to each of the partial spatial information transmission devices; and
transmitting by the partial spatial information transmission device, the partial spatial information corresponding to the specific partial spatial information transmission device.

13. A non-transitory computer readable medium having a computer program for delivering spatial information by a plurality of partial spatial information transmission devices existing within a facility, the computer program comprising:
extracting partial spatial information from spatial information relating to the facility for each of the partial spatial information transmission devices based on locations of the partial spatial information transmission devices, the partial spatial information being part of the spatial information and specific to each of the partial spatial information transmission devices; and
transmitting by the partial spatial information transmission device, the partial spatial information corresponding to the specific partial spatial information transmission device.

* * * * *